Feb. 17. 1925.                                                    1,526,486
                          R. W. MUELLER
                          DRILLING VALVE
                        Filed July 1, 1921         2 Sheets-Sheet 2
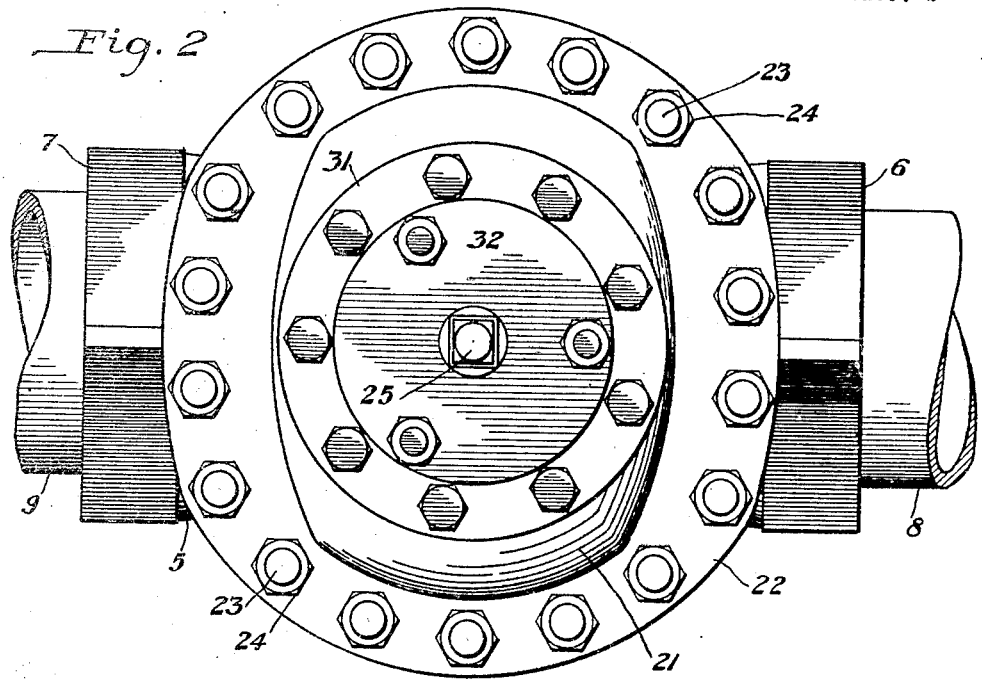
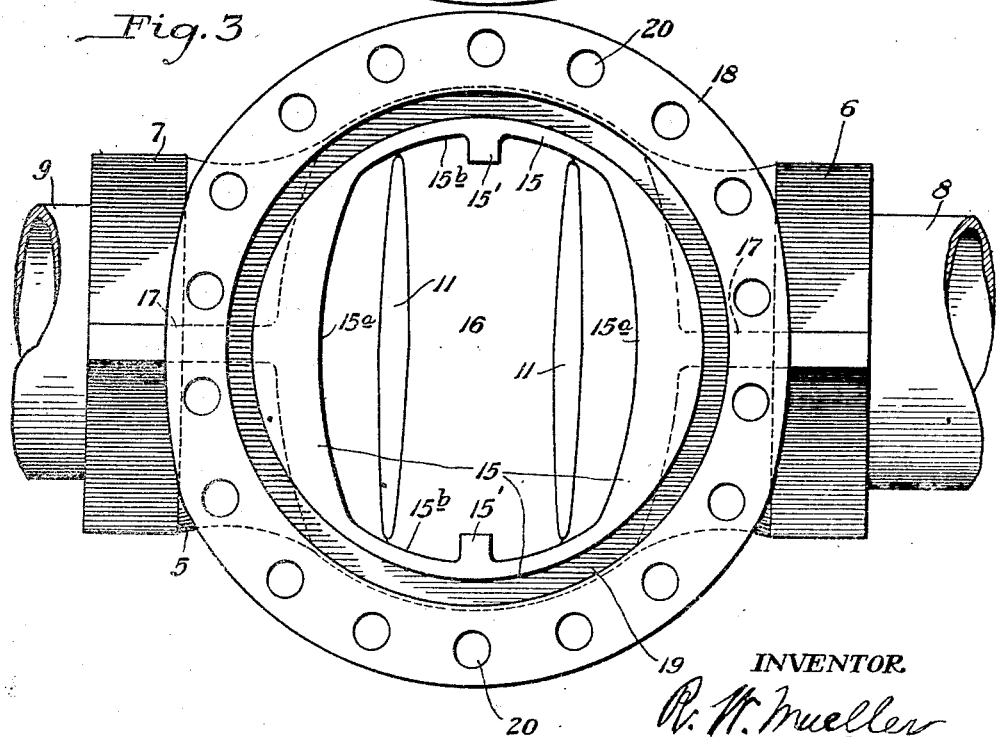
INVENTOR.
R. W. Mueller
by W. G. Doolittle
Attorney.

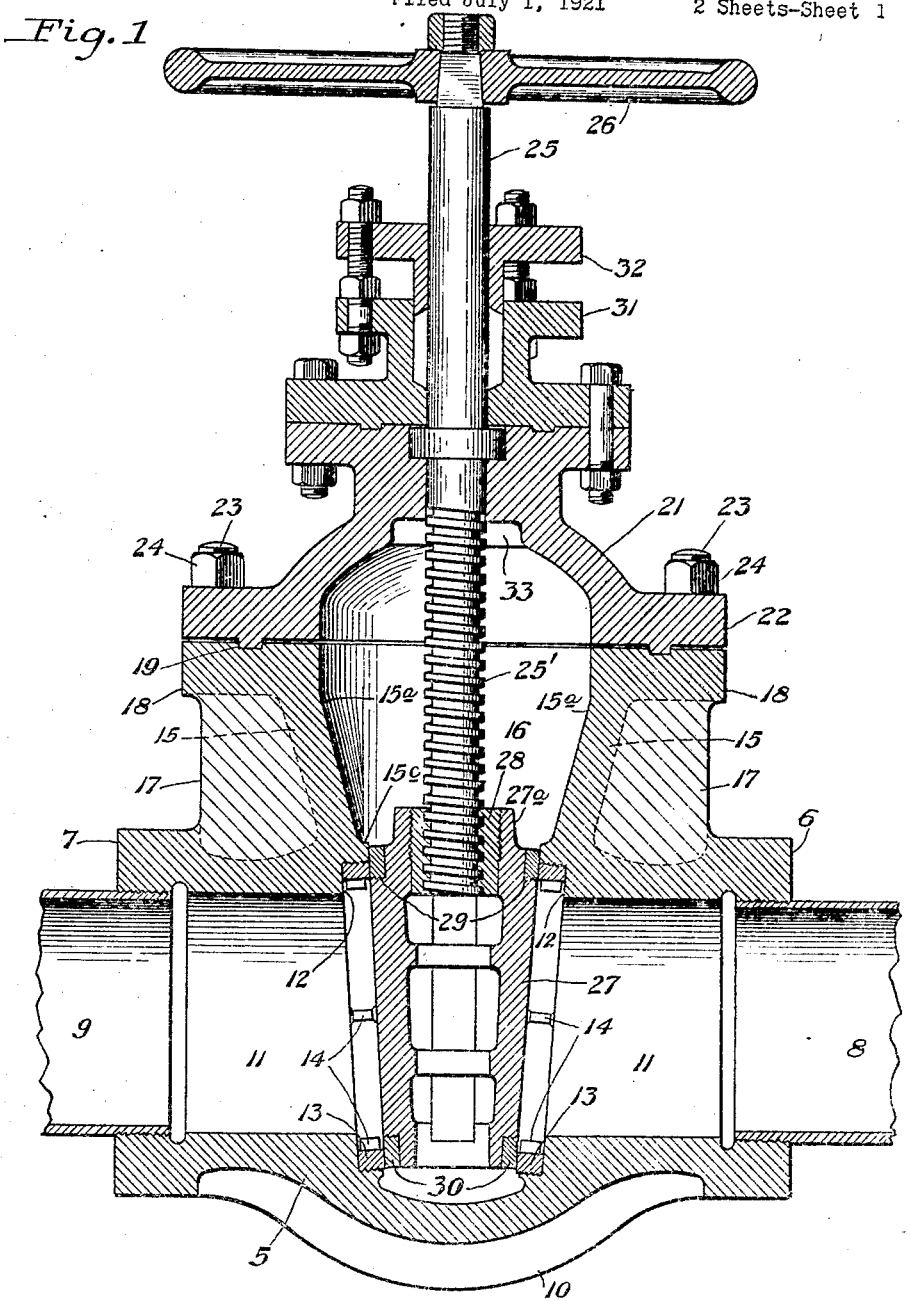

Patented Feb. 17, 1925.

1,526,486

UNITED STATES PATENT OFFICE.

RICHARD W. MUELLER, OF PITTSBURGH, PENNSYLVANIA, ASSIGNOR TO PITTSBURGH REINFORCED BRAZING & MACHINE COMPANY, OF PITTSBURGH, PENNSYLVANIA, A CORPORATION OF PENNSYLVANIA.

DRILLING VALVE.

Application filed July 1, 1921. Serial No. 481,835.

*To all whom it may concern:*

Be it known that I, RICHARD W. MUELLER, a citizen of the United States, residing at Pittsburgh, in the county of Allegheny and State of Pennsylvania, have invented certain new and useful Improvements in Drilling Valves, of which the following is a specification.

This invention relates to a valve of the sliding or reciprocable gate type, particularly designed for use in connection with oil and gas wells.

In drilling oil and gas wells, it is desirable, after the hole has reached a certain depth, to provide a valve at the top of the casing through which a string of drilling tools may be passed and through which the rope from which the string of tools is suspended may operate. This valve is for enabling the flow of gas or oil to be checked after it is struck just as soon as the drilling tool is withdrawn, thus preventing the waste of gas or oil, particularly where high pressure is encountered. These valves must be designed to resist high pressures, and as heretofore made, have been excessively heavy in order to give the valve walls the requisite strength. Furthermore, in valves for this purpose as heretofore commercially used, the seats for the gate have been exposed to injury from the drilling tool, or liable to collect dirt and small pieces of rock or grit.

An object of the present invention is to provide an improved seat arranged out of the path of travel of the drilling tool, and so arranged that it is not liable to become clogged or scored by grit and dirt.

A further object of the invention is to provide a valve having a minimum weight, but so shaped as to resist high pressures.

My invention may be understood by reference to the accompanying drawings, in which:

Fig. 1 is a vertical section through a valve embodying my improvements;

Fig. 2 is a top plan view of the valve with the hand wheel removed;

Fig. 3 is a plan view of the valve body with the bonnet and gate removed.

In the drawings, 5 indicates the valve body having ends 6 and 7 adapted to connect with pipes 8 and 9. Pipe 8 may represent a well casing. On the side of the body is a strengthening rib 10. Extending through the body from end to end, is the straight passage 11.

The diameter of the passage 11 is increased at a point about midway between the ends, shoulders being formed at 12. These shoulders are preferably at an angle to the axial center of the passage, so that the recessed portion, or portion of greater diameter, is wedge shaped. Threaded against the shoulders 12 and in the recessed portion are annular seats 13. On the inside of the rings or seats 13 are lugs 14 for assisting in screwing the rings into place. By reference to Fig. 1, it will be seen that the rings are set back out of the passageway 11. Their thickness does not exceed, and as shown is preferably less, than the width or depth of the shoulder 12. It is apparent that any drilling tool which can pass through the valve passage 11 cannot contact with the inset or recessed rings 13. Furthermore, the said rings cannot be injured or worn by the movement of the cable from which the drilling tools are suspended and operated.

On the side of the body 5 opposite the strengthening rib 10, and projecting from around an opening leading into the passageway 11 through which passes the valve gate, to be hereinafter described, are walls 15. These walls enclose a chamber 16. The walls slope outwardly, so that the chamber is wider at the outer end than it is adjacent the main body of the valve. In cross section, the general shape of the chamber is elongated or rectangular, having a greater length crosswise of or transversely to the passage 11 than parallel with it, as clearly shown in Fig. 3.

Instead of the chamber being truly rectangular, however, as is the ordinary chamber usually employed in gate valves, the walls at the sides are curved, as indicated at 15$^a$, and the end walls are curved as indicated at 15$^b$, but the curvature of the walls at 15$^a$ is struck from a greater radius than the curvature at the ends at 15$^b$. The bottom of the chamber at the sides is rounded out over the seat rings 13 at 15$^c$. At 17 are strengthening ribs of which there are two, one at each end of the valve. The sectional shading of the webs or ribs has been shown lighter in Fig. 1 than the sectional shading of the walls 15, though they are integral, in order that the thickness of the walls may be clearly shown.

Within the chamber 16 on the end walls thereof and extending into the recessed portion of passage 11, is a rib 15' which forms a guide for the gate, in a manner well understood in the art.

Formed integrally with the walls 15 at the top thereof is a flat flange 18 having a packing groove 19 therein. Passing through the flange at intervals, are bolt holes 20. The flange is shaped to correspond somewhat with the shape of the chamber, and some of the holes 20 are in a curve which is different from the curve in which other of the holes lie, the curves being struck from different radii.

The chamber 16 is closed by a bonnet 21 having a flange 22 corresponding to flange 18 and having bolt holes therein which register with the holes 20 in the flange 18. The flange 22 has a tongue adapted to project into groove 19 in flange 18. The bonnet is held in place by bolts and nuts 23 and 24, respectively.

The bonnet provides a bearing for a shaft 25 having a handwheel 26 on its projecting outer end and a threaded inner end 25'. A gate is indicated by 27, and this gate has a threaded sleeve 28 therein which engages the threaded end 25' of shaft 25. When the shaft 25 is turned, the gate is raised and lowered, in a manner well understood. The gate 27 has shoulders at 29 on which are threaded valve seat engaging rings 30. Supported on the bonnet 21 is the lower member 31 of a gland of which 32 is the upper member.

The interior of the bonnet is arched to increase the size of chamber 16, and at 33 is a recess for receiving the extension 27ª on the gate 27. At the point where the gate passes from the chamber 16 into the passage 11, the chamber 16 is just sufficiently wide to receive the upper end of the gate. From this point it widens out. By reason of the curvature and slope of the walls and the shape of chamber 16, the walls 15 may be of minimum thickness. In actual tests, a valve constructed in accordance with my invention has withstood a continued pressure of kerosene of 2700 pounds per square inch for several days, without injury.

Valves of the size heretofore made for this purpose to resist pressures this high, have weighed several hundred pounds more than one constructed as herein described. Since the valve under test weighed about 1800 pounds, it will be appreciated that a considerable saving of metal is effected by my improved construction. As the valve, to pass the test for safety and efficiency, had only to withstand a pressure of 2500 pounds for two days, it is apparent that the factor of safety has not been eliminated in the improved design.

The seat rings for the gate being recessed from the passage 11, are not in position to be injured by the tools, even if the tools are blown out with great force by the pressure of the gas, as is sometimes the case, or by the drilling rope. Being threaded against shoulders 12, they are firmly held in place and are not liable to become loosened. Furthermore, the valves being disposed out of the passageway are less likely to accumulate dirt and grit.

I claim:

1. A gate valve comprising a body having a passageway therethrough, a gate reciprocable transversely across the passageway, annular recesses formed therein at each side of the path of travel of the gate, and seating rings secured in the recesses and supported at their peripheries and around the rear faces by the body, said seat rings coacting with the gate, and being of less thickness than the depth of the recesses, whereby the rings are entirely set back out of the passageway.

2. A gate valve comprising a body having a passageway therethrough, a gate reciprocable transversely across the passageway, the passageway in the body having an annular recess therein at each side of the path of travel of the gate, and a metallic seating ring of less thickness than the depth of the recesses and having a threaded periphery screwed into each recess, said seat rings thus being set back entirely out of the passageway.

3. A gate valve comprising a body having a passageway therethrough, an elongated chamber communicating with the passageway having enclosing walls which are integral with the body and project therefrom, a gate reciprocable in the passageway and chamber, the walls of the chamber being sloped inwardly on the longer sides which are adjacent the faces of the gate and being curved while the walls at the end of the gate are also curved, the curvature of the side and end walls being struck from different radii, a flange formed at the top having a circular channel therein, an integral strengthening rib extending in the direction of the length of the body beneath the flange and extending down to the body with which it is also integral for strengthening the walls of the chamber at the longer sides, a bonnet having a flange secured to the flange on the walls of the chamber, a circular rib on the bonnet which enters the channel in the flange of the body and gate reciprocating means carried by the bonnet.

In testimony whereof I affix my signature.

RICHARD W. MUELLER.